United States Patent [19]

Ravagnan

[11] Patent Number: 5,711,633
[45] Date of Patent: Jan. 27, 1998

[54] APPARATUS FOR RECOVERING FLUID SUBSTANCES FLOATING ON A WATER SURFACE

[76] Inventor: Giancarlo Ravagnan, Riviera San Benedetto 142, 35139 Padova, Italy

[21] Appl. No.: 612,941
[22] PCT Filed: Sep. 19, 1994
[86] PCT No.: PCT/EP94/03130
§ 371 Date: Mar. 12, 1996
§ 102(e) Date: Mar. 12, 1996
[87] PCT Pub. No.: WO95/08673
PCT Pub. Date: Mar. 30, 1995

[30] Foreign Application Priority Data

Sep. 24, 1993 [IT] Italy ............................. PD93A0188

[51] Int. Cl.$^6$ .................................................. E02B 15/04
[52] U.S. Cl. .................. 405/60; 210/242.3; 210/923; 405/52
[58] Field of Search .................. 405/60, 63–72; 210/242.3, 242.1, 923, 179

[56] References Cited

U.S. PATENT DOCUMENTS

| | | | |
|---|---|---|---|
| Re. 32,298 | 12/1986 | Baer et al. ............. | 210/242.3 X |
| 3,358,838 | 12/1967 | Kosar et al. ............ | 210/242.3 X |
| 4,172,036 | 10/1979 | Morris ................... | 210/242.3 |
| 4,360,429 | 11/1982 | Morris ................... | 210/242.3 |
| 4,368,122 | 1/1983 | Ravagnan ................. | 210/923 X |
| 4,473,469 | 9/1984 | Ayroldi .................. | 210/923 X |
| 4,642,185 | 2/1987 | Turner et al. ........... | 210/242.3 |
| 5,460,735 | 10/1995 | Burt ..................... | 210/242.3 X |

FOREIGN PATENT DOCUMENTS

| | | | |
|---|---|---|---|
| 3037784 | 4/1981 | Germany . | |
| 3017293 | 11/1981 | Germany . | |
| 2041231 | 9/1980 | United Kingdom ........ | 210/242.3 |
| 2089228 | 6/1982 | United Kingdom . | |

*Primary Examiner*—Dennis L. Taylor
*Attorney, Agent, or Firm*—Guido Modiano; Albert Josif

[57] ABSTRACT

Apparatus for recovering fluid substances floating on a water surface, comprising multiple disks which are arranged on at least one horizontal shaft, are partially immersed in the water, and rotate at different speeds and particularly alternately clockwise and counterclockwise. The partially submerged disks, by using the principle of the higher adhesion of oily substances relative to water, collect these oily substances, which are then removed by scraping systems and conveyed into a containment space.

9 Claims, 5 Drawing Sheets

APPARATUS FOR RECOVERING FLUID SUBSTANCES FLOATING ON A WATER SURFACE

BACKGROUND OF THE INVENTION

The present invention relates to an apparatus for recovering fluid substances floating on a water surface.

More particularly, it relates to an apparatus that can be installed on stationary or moving watercraft which operates in bodies of water where floating fluid substances, such as oil or its derivatives, are present.

These fluids may be present due both to accidental causes, such as oil or fuel spills caused by accidents at sea, and to the accumulation in basins of wastewaters from treatments that entail the use of greases or oils, or even due to natural causes, such as spontaneous surfacing.

Other cases are, for example, basins for collecting the water of areas for the loading and unloading of hydrocarbons, vehicle washes, et cetera.

Devices for collecting these floating fluid substances are already known; they use the principle of the different adhesion of these substances with respect to water.

It is in fact known that if a body is immersed in water in which a substance such as a hydrocarbon is floating and is then removed, said body remains coated by adhesion with a film of hydrocarbon with a small amount of water.

Starting from this principle, devices have been produced which have rotating disks that are partially immersed in the water and arranged on a horizontal shaft.

In this manner, regions of the disk continuously enter the water and emerge soiled with the hydrocarbons that are present; these hydrocarbons are then removed by means of scrapers provided in the region above the water.

The problem that arises in these devices is their efficiency, i.e. their ability to gather and collect from the water the largest possible amount of floating substances with the lowest possible percentage of water.

Long tests and trials conducted even by the Applicants themselves have shown that many parameters affect efficiency in the collection of these products.

A first parameter is linked to the viscosity of the fluid to be collected, whereas a second important parameter is the speed at which the collection means, which is a disk in the specific case, enters the water and correspondingly resurfaces.

These two parameters are certainly linked one another, but in any case it has been observed that by increasing the speed of the disk the gathering of material from distant regions and its collection increase, but the percentage of water simultaneously collected also increases.

These devices are mainly meant for emergency intervention in case of accidents at sea, in lakes, or in rivers, and therefore while it is important to quickly collect as much floating product as possible it is equally important to avoid collecting an excess of water at the same time, which would fill the storage tanks undesirably.

Another phenomenon which always occurs in systems using disks or in any case bodies that enter the water and emerge therefrom is a partial separation of collected fluid from said body as it surfaces.

In practice, according to the type and viscosity of the floating fluid product and also to the ambient temperature, a layer of fluid continues to adhere to the emerging surface; said layer cannot exceed a certain thickness, whereas the excess separates when leaving the water surface.

This produces a gradually rising accumulation of floating substances in the part that corresponds to the inactive region of the disks.

Systems are also known which, in order to solve this problem, even if only partially, place multiple consecutive batteries of disks mounted on parallel shafts.

Nonetheless there is still the problem that the last battery generates discharges, albeit modest ones, of uncollected product.

Another problem occurring in these recovery operations with these systems is the need to produce a current for drawing the floating product towards the collecting disks.

SUMMARY OF THE INVENTION

A principal aim of the present invention is to provide an apparatus for recovering fluid substances floating on a water surface which solves, as much as possible, the problems linked to these systems and particularly is able to improve the product gathering and recovery capability.

A consequent primary object is to provide an apparatus in which it is possible to perform adjustments according to the type of product to be recovered, to the amount of said product which is present in the work area, to the ambient temperature, et cetera.

Another object is to provide an apparatus which is constructively simple and non-critical in operation.

Another important object is to provide an apparatus wherein it is possible to perform case-by-case adjustment so that the percentage of water contained in the recovered product is the desired one.

Another object is to provide an apparatus which is easy to operate with a small number of operators.

This aim, these objects and others which will become apparent hereinafter are achieved by an apparatus for recovering fluid substances floating on a water surface, of the type comprising multiple motorized disks which are arranged side by side on a horizontal shaft, partially immersed in the water, and provided with elements that scrape the collected or simply gathered product, characterized in that it comprises a series of disks mounted on at least one horizontal shaft, each one of said disks having a variable speed and direction of rotation, said direction of rotation being preferably alternately clockwise and counterclockwise in the sequential arrangement of said disks.

BRIEF DESCRIPTION OF THE DRAWINGS

Further characteristics and advantages of the invention will become apparent from the following detailed description of some preferred embodiments, illustrated only by way of non-limitative example in the accompanying drawings, wherein.

DESCRIPTION OF THE PREFERRED EMBODIMENTS

Figure 1:
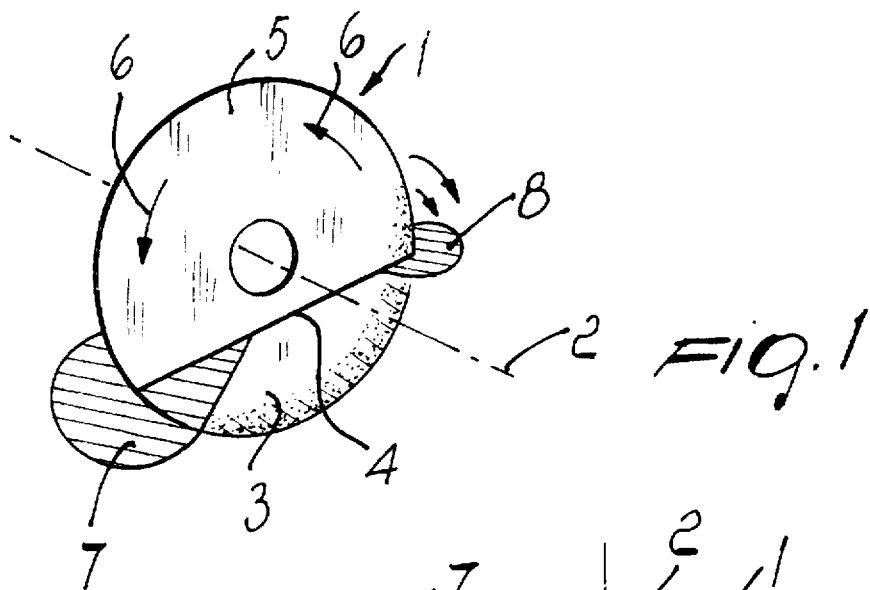
FIGS. 1, 2, 3, and 4 are views that schematically show the operation of the collecting disks.
Figure 2:
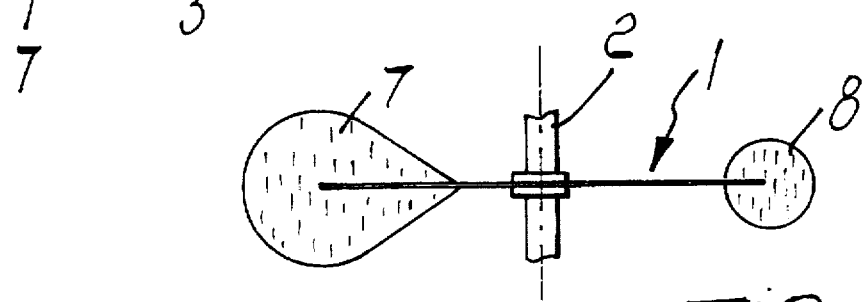

With reference to the above figures, a disk 1 for recovering substances floating on the water is mounted on a motorized shaft 2 and has a sector 3 that is immersed in the water, the free surface whereof is designated by the reference numeral 4, whereas the second sector 5 lies above the water.

The disk 1, by rotating in the direction indicated by the arrow 6, produces a region 7 where it enters the water drawn towards said disk, so that the oily substances that are present in this region wet the disk and adhere to it.

A second region, designated by the reference numeral 8, is formed where the disk leaves the water; the part of oily substance that has followed the disk but cannot remain attached thereto because the resulting thickness would be excessive, accumulates in said region.

The region 7 is referenced hereinafter as the useful collection region and the region 8 is referenced as the discharge region.

As the speed of the disk increases, the region 7 gradually becomes larger, but the amount of discharges, visualized by the region 8, also becomes larger.

In addition to this, as the speed of the disk increases, a greater amount of water adheres to said disk together with the oily substances and is thus collected by the scraper elements that separate the material that has adhered to said disk.

Figure 3:
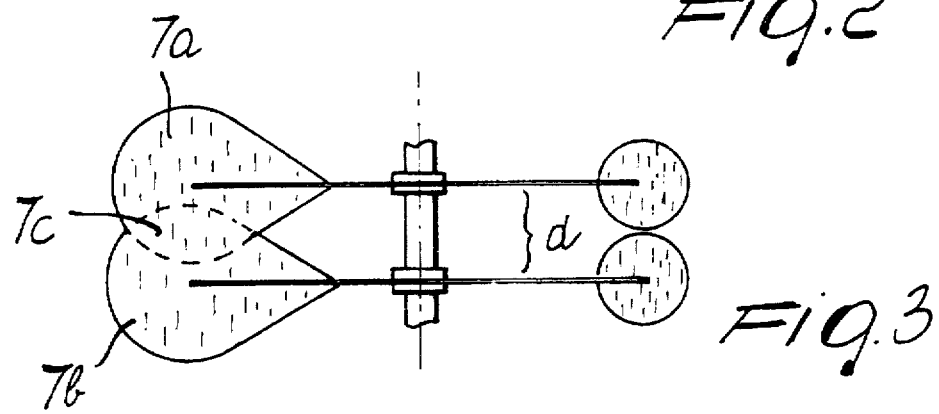

In order to achieve maximum collecting efficiency, one must prevent the distance d between two successive disks from producing a situation such as the one shown in FIG. 3, where the active collection regions, now designated by the reference numerals 7a and 7b, overlap and form a region 7c where the floating product would be simultaneously attracted by the two contiguous disks.

Figure 4:
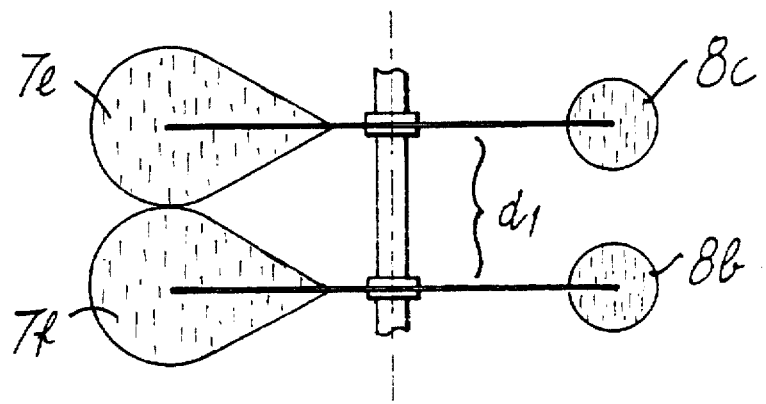

According to the viscosity of the product to be recovered and to the percentage of water that is considered acceptable, the disks must be arranged as in FIG. 4, where the distance $d_1$ of the two adjacent disks produces two active regions 7e and 7f which are mutually contiguous.

Nonetheless, in this configuration there are discharges 8a and 8b which cannot be recovered in any way and remain floating on the water.

Figure 5:
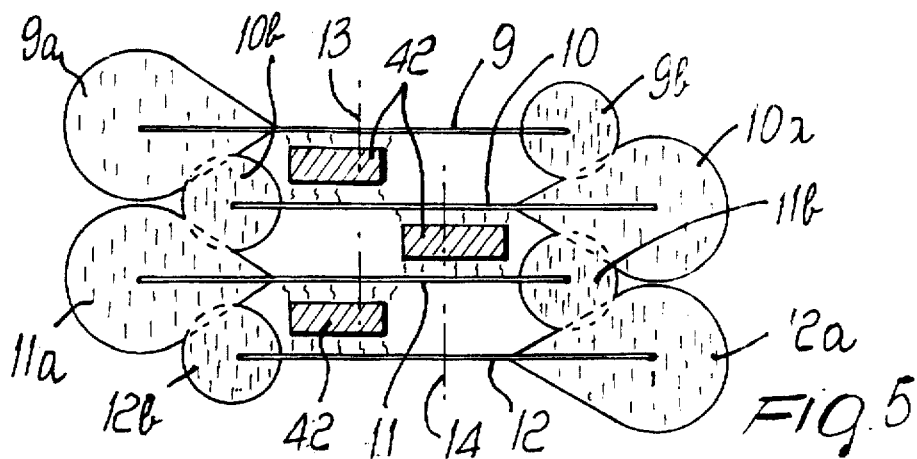
FIG. 5 is a diagram of the operation of the disks of the type used in the apparatus according to the invention.

In order to solve the problem, it is convenient to adopt the configuration of FIG. 5, which illustrates a series of contiguous disks designated by the reference numerals 9, 10, 11, and 12.

As shown, the two disks 9 and 11 operate exactly like the disks shown in FIG. 4, and the same holds for the two disks 10 and 12, which however rotate in the opposite direction with respect to the other two disks.

This entails that the active regions, designated by the reference numerals 9a and 11a, include the rejection regions of the disks 11 and 12, designated by the reference numerals 10b and 12b.

Correspondingly, the active regions 10a and 12a of the disks 10 and 12 comprise, in their active region, the rejection regions 9b and 11b of the disks 9 and 11.

In order to obtain such an arrangement of the recovery and rejection regions, the pairs of disks, respectively 9 and 11 and 10 and 12, are not mounted on the same shaft but are mounted on parallel shafts designated by the reference numerals 13 and 14.

Figure 6:
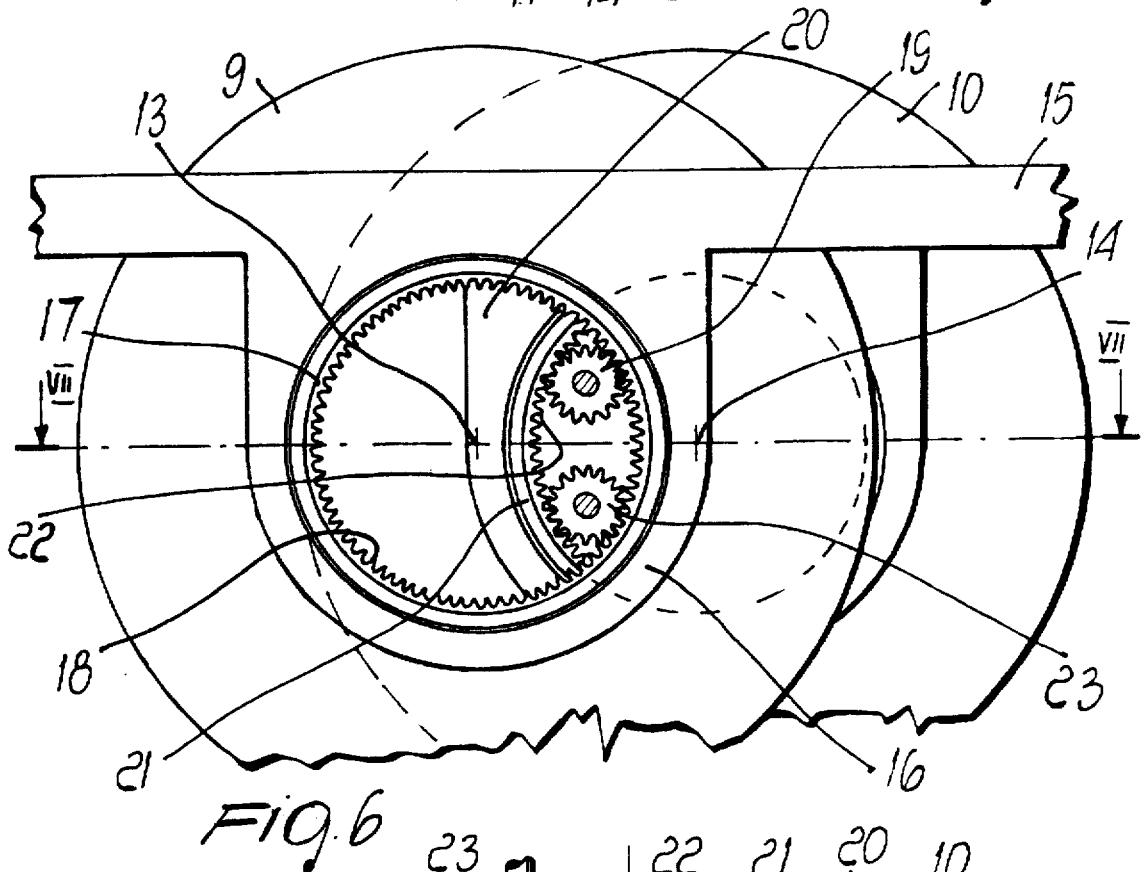
FIGS. 6 and 7 are two views of a watercraft provided with the apparatus according to the invention.

The distance between these two shafts 13 and 14, as more clearly shown in FIG. 6, is smaller than the radius of said disks, which radius is equal for all disks; two adjacent disks are designated by the reference numerals 9 and 10 in FIG. 6.

Figure 7:
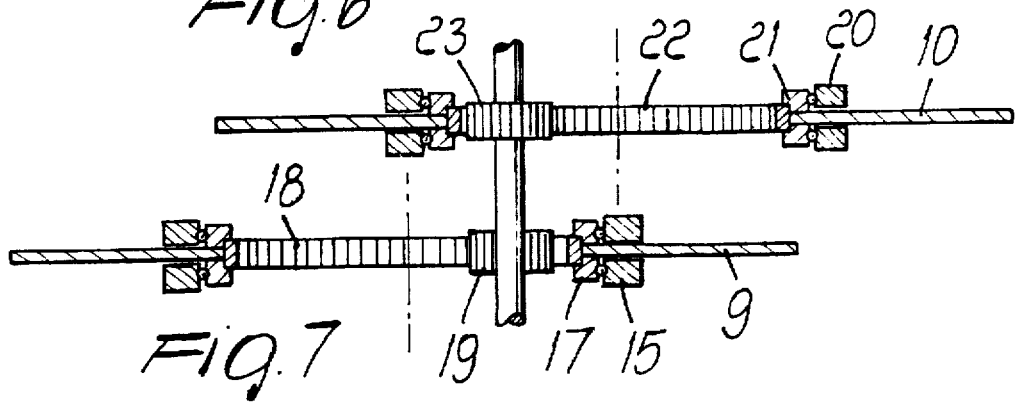

In order to drive each alternating series of disks simultaneously but in opposite directions it is possible to use a kinematic system of the kind shown in FIGS. 6 and 7.

Each disk is supported by a beam 15 which is rigidly coupled to the apparatus or to its frame, which is not shown in the figures.

A bearing, or a pivoting ring of appropriate dimensions, designated by the reference numeral 16, supports the disk, which internally has a hollow circular region 17 that is internally provided with a ring gear 18 that meshes with a pinion 19 that makes it move in a desired direction.

In a substantially equivalent manner, the next adjacent disk is supported by a bearing or a pivoting ring 20 in which a ring 21 rotates; said ring has an internal set of teeth 22 that meshes with a pinion 23 which is driven in a different direction and, optionally, at a different rate with respect to the pinion 19.

A structure of this type, which is anyway an example, allows to rotate two mutually alternating pairs of series of disks at different speeds and with reversed directions, connecting them to two drive units not shown in the figure.

Figure 8:
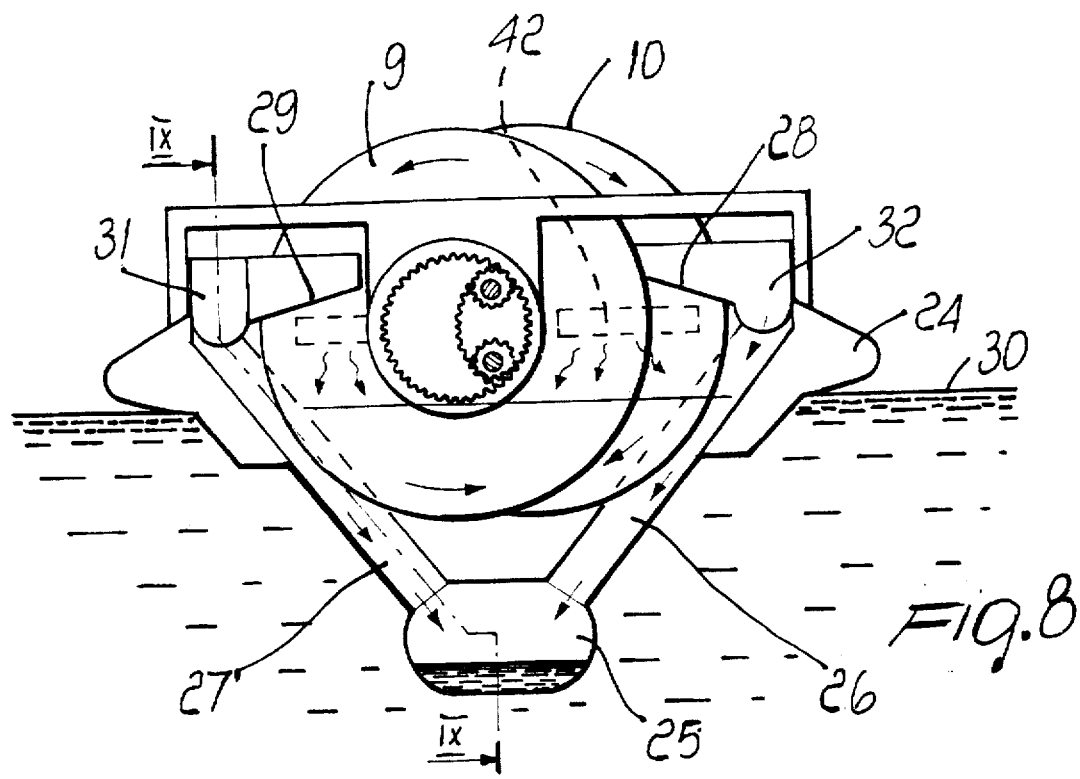
FIG. 8 is a schematic view of the drive means of the disks of the apparatus, taken along the rotation axis.
Figure 9:
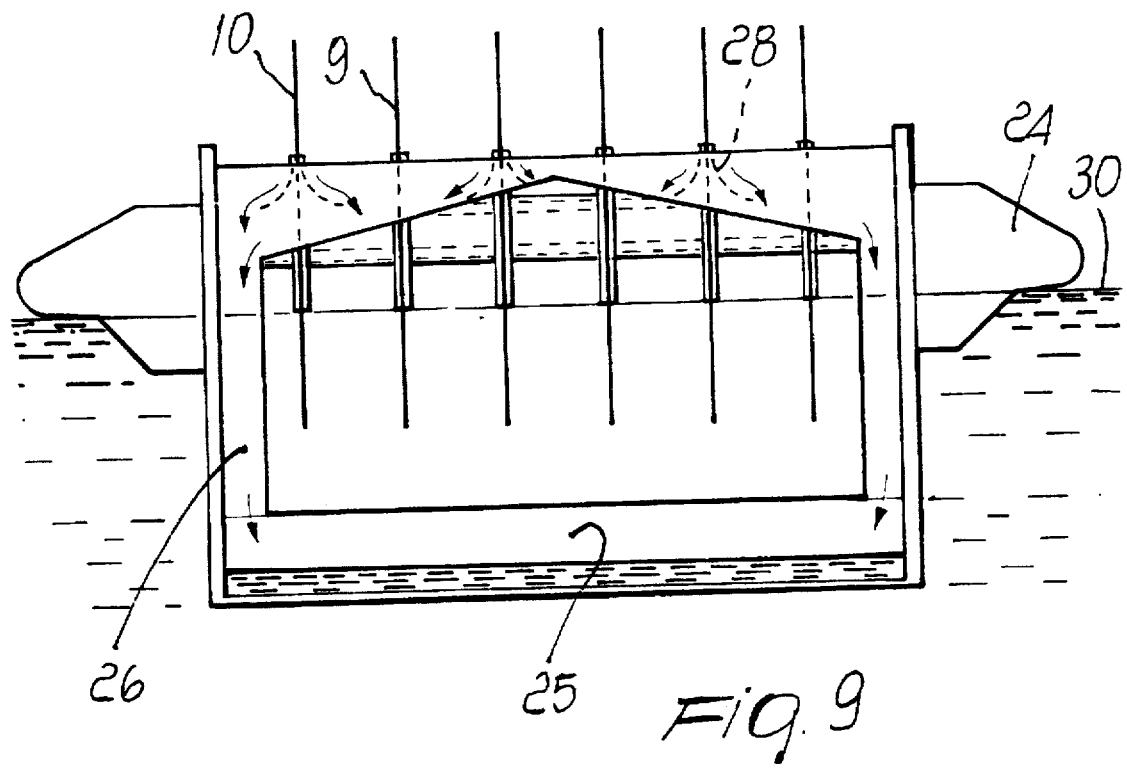
FIG. 9 is a sectional view of the apparatus of FIG. 8, taken along the plane IX—IX of FIG. 8.

In practice, an apparatus of this type can be of the self-floating type, as shown in FIGS. 8 and 9.

In this case, by using the same reference numerals as in FIGS. 7 and 8, said figures show two disks, again designated by the reference numerals 9 and 10, which are mounted on a structure having a floating ring 24 that supports a framework below which there is a collection tank 25 into which two channels 26 and 27 lead; the product descends into these channels from the upper region, where the separation scrapers 28 and 29 are provided.

Essentially, in the region that emerges from the free surface of the water 30 the scrapers 28 and 29 separate the product that has adhered to the disks and convey it onto two sloping gutters 31 and 32 that carry it into the channels 26 and 27 and then into the tank 25.

This self-floating structure is an example showing that the apparatus can be advantageously used in a collection vehicle.

Figure 10:
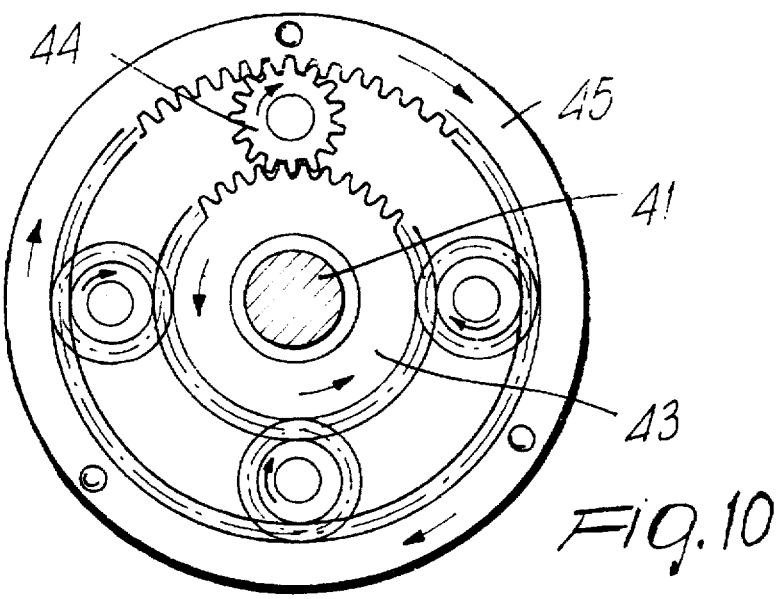
FIGS. 10 and 11 are views of a second method for motorizing a series of mutually adjacent disks with alternating rotation directions.
Figure 11:
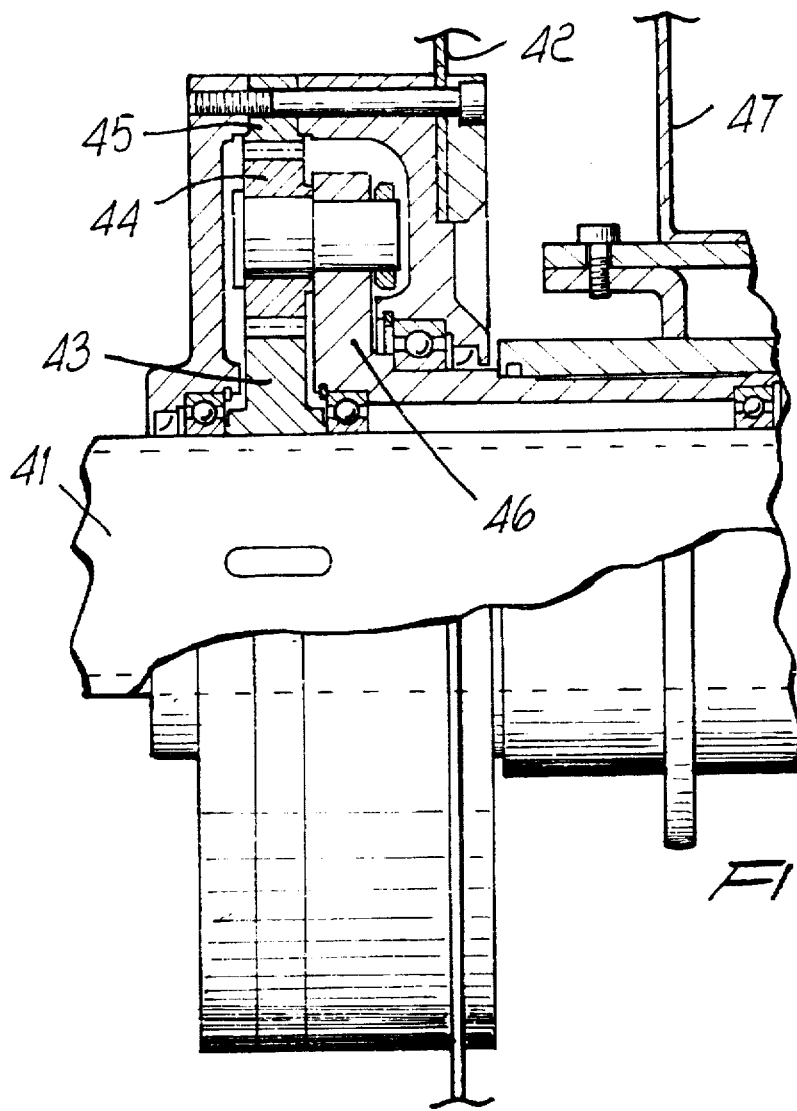

FIGS. 10 and 11 illustrate a second method for motorizing the disks with alternately reversed rotation directions.

In this case, the disks are mounted on a single supporting shaft, and thus there is no diversification or relative movement between two adjacent disks.

The motorized central shaft 41, as regards the first one of the disks shown in the figure, designated by the reference numeral 42, is provided with a pinion 43 that drives, in the case shown, four planetary gears 44 which further mesh with an external ring gear 45 that is rigidly coupled to the disk 42.

The planetary gears 44 are mounted on a support 46 which is rigidly coupled to the frame of the machine.

The adjacent and therefore consecutive disk, designated by the reference numeral 47, is instead directly keyed on the shaft 41, from which it receives its motion, which is accordingly opposite to the motion of the disk 42.

The choice of the ratios between the pinion 43 and the ring gear 45 produces an identical or different rotation rate of the disk 42 with respect to the disk 47.

Figure 12:
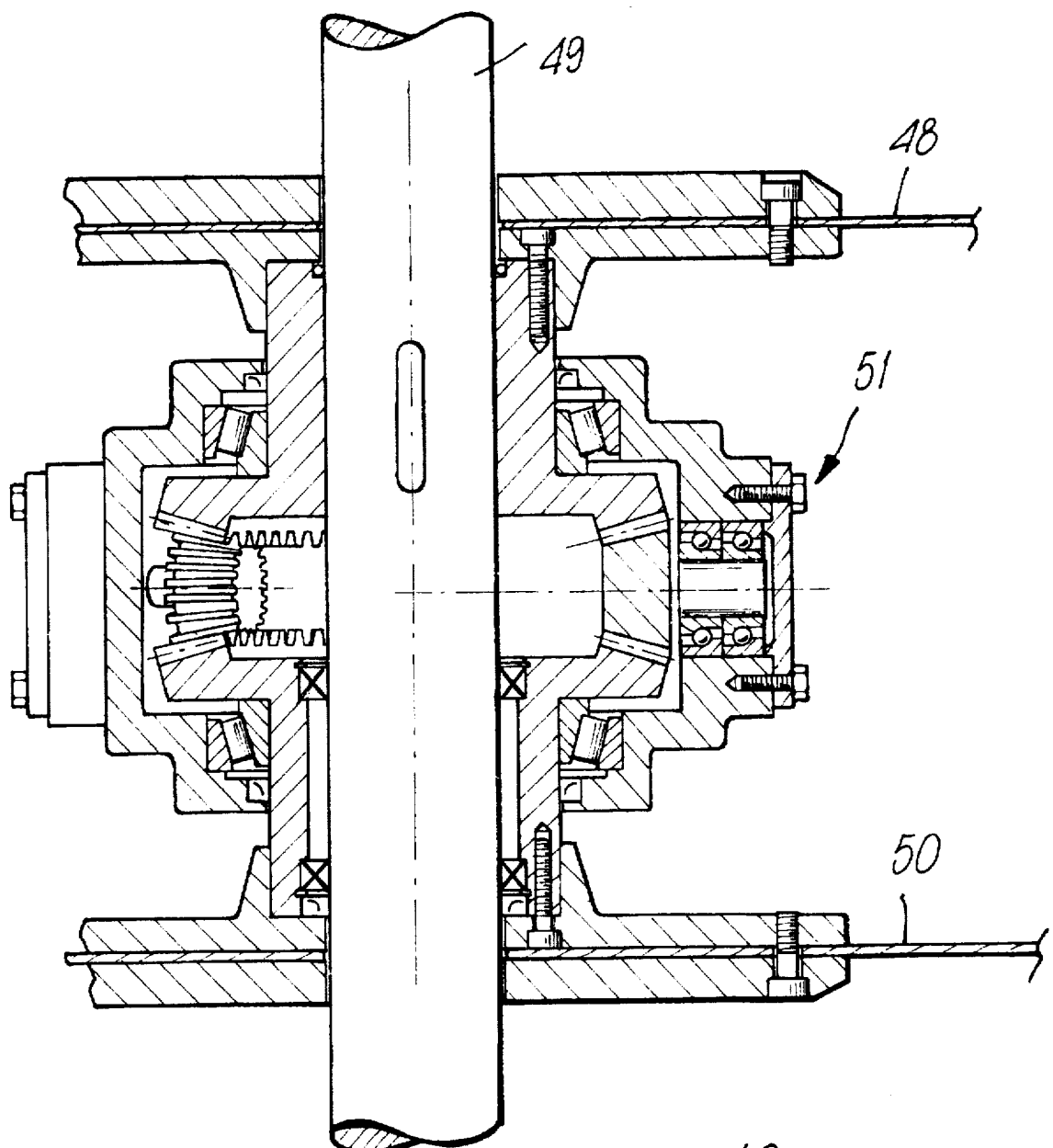
FIG. 12 is a view of a third method for motorizing a series of mutually adjacent disks.

FIG. 12 illustrates a second method for providing motion reversal between the disk 48, which is keyed directly on the motorized shaft 49, and the disk 50, which receives its motion from a differential unit 51.

It is in any case equivalent to achieve the motorization of the disks with independent oleodynamic motors and transmissions so that both the rotation direction and the rotation rate are chosen in any desired manner.

Conveniently, it is possible to provide a system for heating the floating product; said system can be constituted by radiating elements which are located between the disks (not illustrated).

Said radiating elements, which can be supplied electrically, with steam or with hot water, need only to heat the product to be recovered, whereas it is convenient for the disks to remain cold, thus achieving better adhesion of the fluidified oil.

The product that the disks reject because it is solid in fact collects in this region, and this selective heating also has the advantage of providing enormous energy efficiency and savings.

The proposed examples show that without altering the concept that two adjacent disks can have different rotation directions and rates, it is possible to choose equivalent but different mechanical transmission means.

It is also possible to adopt, in the same structure and starting from the same concept, different solutions that are not shown in the figures and allow to drive each disk independently from one another and not according to just two alternating series of disks.

This allows to choose for each disk not only the rotation rate but also the direction with respect to the adjacent disks.

In this manner it is possible, for example, to assign a series of disks to the collection of the material that is floating on the free surface of the water by giving them, as already mentioned, appropriate rotation rates chosen according to the type and viscosity of the product to be collected.

A series of other disks, arranged for example at the center or at the ends of the succession of the set of disks, can be rotated at much higher rates so as to act not so much as collecting disks but rather as disks that produce a current for gathering the floating product.

In this specific function it is possible to provide scrapers that do not separate the product to convey it into the collection means but separate the product to make it fall back into the water proximate to the collection disks.

The versatility of this system allows to choose the best way to collect the floating product together with the best way to generate a gathering current.

The independent operation of the set of disks or of groups of said disks allows to choose, also according to the changed conditions of the basin or of the product to be attacked, the best configuration to optimize the operation of the apparatus.

It is in any case essential to be able to rotate adjacent disks in opposite directions, since this is the most convenient way to recover, in the active region, the largest amount of product with the smallest amount of water and to avoid losing the discharges which unavoidably form in the inactive region.

The apparatus can be conveniently mounted on an independent floating vehicle provided with a first temporary collecting tank that is connected to other larger tanks or directly connected to a support vehicle-tanker by means of a pipe.

The apparatus itself may also be not self-floating, i.e. it may be supported or contained in a watercraft which can also act as first collecting tank.

It is evident that starting from the same inventive concept the structure can be provided differently, also by choosing appropriate mechanical, electric, hydraulic and other driving means, without thereby abandoning the scope of the teachings contained in what has already been described.

Likewise, the materials and the dimensions may be any according to the requirements.

What is claimed is:

1. Apparatus for recovering fluid substances floating on a water surface, comprising multiple mutually alternately staggered disks that form two separate sequential arrangements of disks rotatable about respective parallel axes and with two drives that allow to apply a different motion to each sequential arrangement, each disk of said disks substantially having an equal radius and a distance between the parallel rotation axes being smaller than the radius of said disks so that mutually adjacent disks are arranged such that a collection region of a first disk formed where said first disk enters the water overlaps a discharge region of an adjacent second disk formed where said second disk exits the water.

2. Apparatus according to claim 1, further comprising elements for scraping said disks for gathering collected product.

3. Apparatus according to claim 1, wherein a first drive of said two drives is adapted for applying a first motion to a first sequential arrangement of disks and a second drive of said two drives is adapted for applying a second motion to a second sequential arrangement of disks, said first motion being opposite to said second motion.

4. Apparatus according to claim 1, wherein each of said disks is centrally supported by a bearing that forms a circular open central region where there is an internally toothed ring gear, a pinion engaging on said ring gear and being rigidly coupled to a motorized shaft that passes through said open central region.

5. Apparatus according to claim 4, wherein two individually motorized parallel shafts arranged on a same horizontal plane pass through said open region, each one of said shafts defining one of said parallel axes and supporting multiple pinions which engage and drive disks in alternating sequence.

6. A method of recovering fluid substances floating on a water surface, comprising the steps of:

arranging a first sequential arrangement of disks for rotation about a first axis;

arranging a second sequential arrangement of disks for rotation about a second axis which is parallel to and spaced from said first axis such that said second sequential arrangement of disks is staggered with respect to said first sequential arrangement of disks and further such that the disks of said first and second sequential arrangements of disks substantially have an equal radius and a distance between the parallel first and second rotation axes is smaller than the radius of said disks;

rotating said first sequential arrangement of disks about said first axis such that a first motion is applied to said first sequential arrangement of disks and simultaneously rotating said second sequential arrangement of disks about said second axis such that a second motion is applied to said second sequential arrangement of disks which is opposite to said first motion such that a collection region of a first disk of said first sequential arrangement formed where said first disk enters the water overlaps a discharge region of an adjacent second disk of said second sequential arrangement formed where said second disk exits the water.

7. A method according to claim 6, wherein said first sequential arrangement of disks is rotated at a different rate than said second sequential arrangement of disks.

8. A method according to claim 6, further comprising the step of scraping said disks for collecting said fluid substances.

9. A method according to claim 7, further comprising forming a discharge region of said first disk where said first disk exits the water and forming a collection region of said second disk where said second disk enters the water such that said discharge region of said first disk overlaps said collection region of said second disk.

* * * * *